Patented Sept. 7, 1948

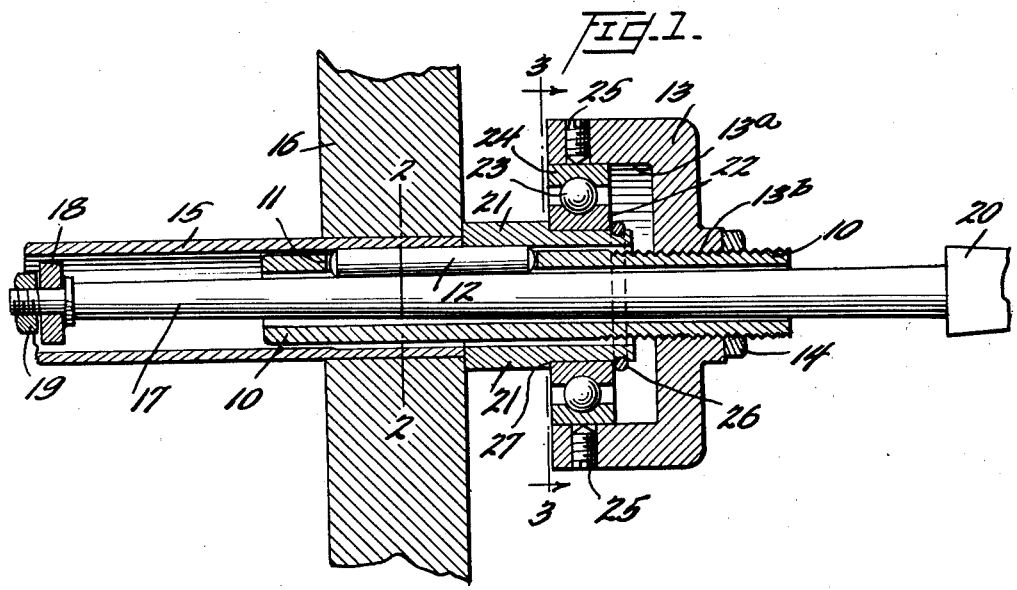
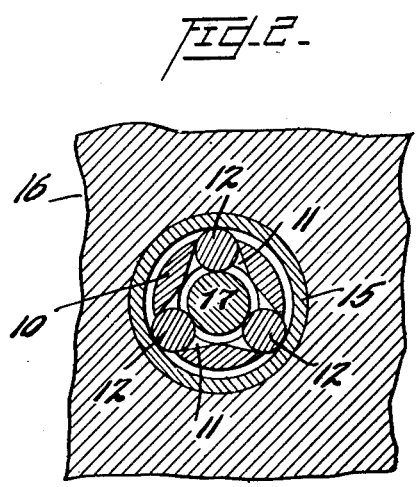
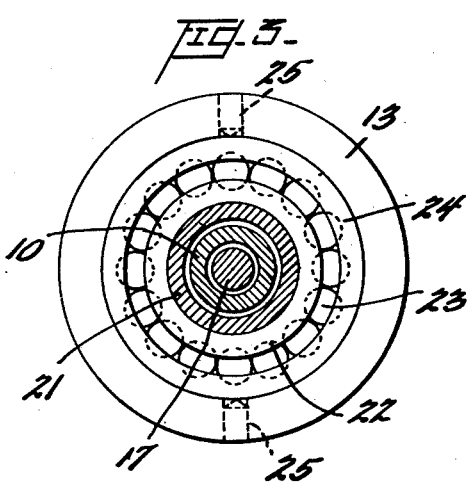
Inventor
Newell Brackett,

2,448,512

UNITED STATES PATENT OFFICE 2,448,512

TUBE EXPANDER

Newell Brackett, Bala Cynwyd, Pa.

Application January 8, 1947, Serial No. 720,780

4 Claims. (Cl. 153—82)

This invention relates to tube expanding tools and it has particular relation to tools for expanding the ends of the tubes of surface condensers, boilers and the like.

The conventional type of rotary expander such as that disclosed in U. S. Patent No. 831,720 comprises a cage carrying three tapered rollers through the center of which passes a rotatable mandrel of corresponding taper. As the mandrel is driven by power means, such as an air or electric motor, it opens up the rollers as it moves forwardly and expands the tube in the header plate, making a tight joint against leakage of steam, water, or other liquid.

In all cases a stop collar is attached to the cage for preventing the rollers from entering the tube beyond the section where expansion is desired. This stop collar also regulates the useable length of the rollers for each individual job, making it possible to use one size expander for many different lengths of rolling. The stop collar surrounds the cage and is rotatable therewith only under initial tool inserting conditions prior to contact of the collar with the end of the tube or header plate surface. The speed of rotation is rapid and due to the self-feeding of the rollers, the forward end of the collar comes in direct and hard contact with the outer face or end of the tube which is usually formed of a non-ferrous or soft metal and in the absence of the present invention the tube end is likely to be worn down due to the frictional contact of the rotating stop collar with the tube, thereby slowing up and retarding the work.

During this frictional contact wear by the collar, small shavings or shearings are cut off the tubes by the rotating steel collar and these small particles of metal become lodged in the roller slots and between the rollers and the mandrel surface. These metal chips cause very rapid galling and wear of the rollers and mandrel, resulting in frequent replacements, additional expense and slowing up of the mechanic's time. Collars made from soft metal, such as bronze or brass have been tried, but the soft collar wears rapidly and does not eliminate the cutting of chips from the tube ends or the friction and heat from rubbing contact.

A principal object of the invention is the provision of an expander of the character described embodying a rotatable stop collar which is designed and adapted to limit the outward radial movement of the rollers and the consequent amount of expansion of the tube to a prescribed diameter, thus preventing overexpansion or attenuation of the tube and a resulting weakening of the tube wall, and also giving a sensitive or tactual signal to the operator when the expanding operation is completed.

A further object of the invention is to provide a tube expanding tool of the character described wherein provision is made for a relatively fixed but adjustable anti-friction bearing connection between the stop collar and an outer cup-shaped housing element which is threaded onto the cage for longitudinal adjustment with the collar therealong.

Another object of the invention is the elimination of the disadvantages above mentioned by the provision of a tube expander having a stop collar rotatably mounted relative to the cage for abutting engagement with the end of the tube and adapted to cease rotating upon contact therewith, thus protecting the tube end from the rotating parts of the tool. This prevents the cutting of chips or shavings, and speeds up the work.

A further object of the invention is the provision of a tube expander having means for leading the tool into the tube and maintaining the same in axial alignment therewith during the expanding operation.

With such objects in view, as well as other advantages which may be incident to the use of the improvements, the invention consists of the parts and combinations thereof hereinafter set forth and claimed with the understanding that the several necessary elements constituting the same may be varied in proportions and arrangement without departing from the nature and scope of the invention as defined in the claims.

In order to make the invention more clearly understood there are shown in the accompanying drawings means for carrying the invention into practical effect, without limiting the improvements in their useful application to the particular constructions and arrangements which, for the purpose of explanation, have been made the subject of illustration.

In said drawings:

Fig. 1 is a longitudinal sectional view of the tube expanding tool constructed in accordance with the invention and with parts broken away, and shown in operating position.

Fig. 2 is an enlarged transverse sectional view on line 2—2 of Fig. 1.

Fig. 3 is a transverse sectional view on line 3—3 of Fig. 1.

Referring to the drawings the improved tube expander is shown as comprising a cylindrical cage 10, the forward portion of which is formed with a plurality of inclined undercut slots 11 in which tapered expanding rollers 12 are rotatably mounted. A cylindrical cup-shaped housing 13 having a forward recess 13a is threaded at 13b onto the rear portion of the cage 10 for longitudinal adjustment therealong, and may be locked in adjusted position by means of a lock-nut 14 also threadedly engaging the screw-threaded portion of the cage 10. The rollers 12 may be forced radially outwardly in order to expand the end of the tube 15 into close sealing contact with a header plate 16 by means of a mandrel 17 having a taper corresponding to that of the rollers 12. A guide roller 18 is rotatably mounted on the forward end of the mandrel 17 and may be removably secured thereon by means of a threaded nut 19. The guide roller performs the dual function of preventing the cage and rollers from becoming displaced from the mandrel and also for guiding the expanding parts of the tool into the tube and maintaining them in axial alignment therewith during the expanding operation. The rear end of the mandrel 17 is formed with a shank portion 20 for attachment to the usual flexible driving shaft of a power source, not shown.

Rotatably mounted within the housing 13 and surrounding the roller cage 10 is a stop collar 21 having rigidly mounted thereon as by a drive or friction fit, the inner race 22 of an anti-friction or ball bearing 23. The outer race 24 of the bearing is rigidly and adjustably secured as by means of one or more set screws or locking pins 25, within the forward recess 13a of the housing 13. One side of the inner bearing race 22 preferably abuts against a shoulder 27 on the collar 21 while the opposite side of the race may be removably locked in place on the collar by means of a split ring element 26 fitting within a shallow groove in the collar adjacent the rear or inner end thereof.

This construction permits of the rotation of the housing 13 on the bearing 23 relative to the stop collar 21 but prevents the axial displacement of the stop collar from or relative to the housing and bearing. The stop collar 21 extends forwardly out of the housing for abutting engagement with the outer end of the tube 15 and overhangs substantial portions of the expanding rollers 12. It will be understood, however, that by increasing the length of the stop collar it can be made to be adjustable of the entire length of the rollers, thus giving the advantage of adjustment from zero to maximum length of roll, which will compensate for any thickness of tube sheet. This eliminates the use of tools having various lengths of rollers. The described structure constitutes a thrust bearing at 23 for the housing 13 and other rotating parts when the stop collar 21 ceases its rotation through the medium of frictional contact of its forward end with the outer end of the tube 15.

The internal diameter of the stop collar 21 is substantially equal to the internal diameter of the tube 15 when the latter is expanded its full or proper amount and thus arrests the outward movement of the rollers when this point is reached. This not only prevents the overexpansion of the tube but serves as a tactual signal to the operator that the expanding operation is completed. The stop collar 21 may be adjusted along the cage 10 for different depths of expansion, by loosening the lock nut 14 and screwing the housing along the threaded portion of the cage 10.

In operation, the expanding tool is first positioned with the cage 10 and parts carried thereby located at the forward end of the mandrel 17, in which position the rollers 12 occupy radially retracted positions within the slots 11 in order to permit of free entrance of the tool into the tube. The tool with all of the parts thereof rotating rapidly, is inserted into the outer end of the fixed tube 15 until the stop collar 21 engages the exposed end of the tube adjacent the face of the header 16 and ceases its rotation. The rotating tapered mandrel 17 is then fed forwardly relative to the now longitudinally stationary remaining parts of the tool, thus forcing the rollers 12 retained in the rapidly rotating cage, radially outwardly until their rear ends engage the cylindrical inner surface of the stationary stop collar and their outward movement arrested thereby. When this occurs the increased friction and resultant drag indicates by "feel" to the operator that the tube has been expanded the proper amount and to discontinue the operation. Fig. 1 shows this final expanding position.

It will be obvious from the foregoing that the stationary stop collar 21 when bearing against the tube performs the dual function of eliminating all cutting or wearing of the tube end heretofore encountered and also prevents the thinning and weakening of the tube wall due to its overexpansion and accompanying undue attenuation. This latter desirable function of the tool is obtained by proportioning the parts so that outward radial movement of the rollers 12 is limited by their contact with the inner surface of the collar 21. The operator is then tactually advised that the expanding operation has been completed with the tube 15 expanded into its desired close metal to metal contact with the perforated header plate 16, as best illustrated in Fig. 1.

The described construction of the housing 13 and bearing 23, as well as the collar 21, affords quick and easy assembly and dismantling for renewal of worn parts.

It will be understood that as previously stated, the above description and accompanying drawings comprehend only the general and preferred embodiment of the invention and that various changes in construction, proportion and arrangement of the parts may be made within the scope of the claims without sacrificing any of the advantages of the invention.

What is claimed is:

1. A tube expanding tool comprising a roller cage, a plurality of expanding rollers rotatably mounted in said cage, a tapered mandrel extending through said cage for rotation therewith and longitudinal movement therein for moving said rollers radially outwardly, a housing mounted on said cage for rotation therewith and longitudinal adjustment therealong, said housing having a cylindrical recess in its forward end, a stop collar rotatably mounted in said housing recess and movable longitudinally with said housing when the housing is adjusted on the cage, said stop collar extending forwardly out of said housing recess for engagement with the end of a tube being expanded to limit the distance said cage and rollers may enter said tube and to cease rotation of the collar upon engagement with said tube to protect the tube against wear during continued rotation of said cage and housing, said stop collar overhanging said expanding rollers so that the inner surface of the collar engages and limits the outward radial movement of said rollers to prevent overexpansion of said tube and to tactually signal the operator when the expanding operation has been completed.

2. A tube expanding tool comprising a roller cage, a plurality of expanding rollers rotatably mounted in said cage, a tapered mandrel extending through said cage for rotation therewith and longitudinal movement therein for moving said rollers radially outwardly, a housing mounted on said cage for rotation therewith and longitudinal adjustment therealong, said housing having a cylindrical recess in its forward end, a stop collar having an anti-friction bearing thereon rotatably mounted in said housing recess, said stop collar being bodily movable with said housing longitudinally of the cage when the housing is adjusted thereon, said stop collar extending forwardly out of said housing recess for engagement with the end of a tube being expanded to limit the distance said cage and rollers may enter said tube longitudinally and to cease rotation of the collar upon its engagement with said tube to protect the tube against wear during the continued rotation of said cage and housing, the forward portion of said stop collar overhanging the adjacent ends of said expanding rollers so that the inner wall surface of the collar engages and limits the outward radial movement of said rollers to prevent overexpansion of said tube and to tactually signal the operator when the tube expanding operation has been completed.

3. A tube expanding tool comprising a roller cage, a plurality of expanding rollers rotatably mounted in said cage, a tapered mandrel extending through said cage for rotation therewith and longitudinal movement therein for moving said rollers radially outwardly, a housing mounted on said cage for rotation therewith and longitudinal adjustment therealong, said housing having a cylindrical recess in its forward end, a stop collar mounted on said housing and rotatable in said recess, an anti-friction roller thrust bearing interposed between said collar and said housing with the inner bearing race secured to the outer peripheral collar surface and the outer bearing race secured to the inner surface of said housing recess, said collar being movable with said housing longitudinally of the cage when the housing is adjusted thereon, said stop collar extending forwardly out of said recess for engagement with the end of a tube being expanded to limit the distance said cage and rollers may longitudinally enter said tube and to cease rotation of the collar upon its engagement with said tube to protect the tube against wear during the continued rotation of said cage and housing, the forward end of said stop collar also overhanging the inner ends of said expanding rollers so that the inner wall surface of the collar engages and limits the outward radial movement of said rollers to prevent overexpansion of said tube and to tactually notify the operator when the tube expanding operation has been completed.

4. A tube expanding tool comprising a roller cage, a plurality of expanding rollers rotatably mounted in said cage, a tapered mandrel extending through said cage for rotation therewith and longitudinal movement therein for moving said rollers radially outwardly, a housing mounted on said cage for rotation therewith and longitudinal adjustment therealong, said housing having a cylindrical recess in its forward end, a stop collar rotatably mounted in said housing recess and movable longitudinally with said housing when the housing is adjusted on the cage, said stop collar extending forwardly out of said housing recess for engagement with the end of a tube being expanded to limit the distance said cage and rollers may enter said tube and to cease rotation of the collar upon engagement with said tube to protect the tube against wear during the continued rotation of said cage and housing, said stop collar overhanging said expanding rollers so that the inner surface of the collar engages and limits the outward radial movement of said rollers under the thrust of said tapered mandrel to prevent overexpansion of said tube and to tactually signal the operator when the expanding operation has been completed, and roller means on the forward end of said mandrel engageable with the tube inner surface for maintaining the tool in substantial axial alignment with the tube during the expanding operation.

NEWELL BRACKETT.

REFERENCES CITED

The following references are of record in the file of this patent:

UNITED STATES PATENTS

| Number | Name | Date |
| --- | --- | --- |
| 119,121 | Clark | Sept. 19, 1871 |
| 709,276 | Palfrey | Sept. 16, 1902 |
| 743,146 | Carty | Nov. 3, 1903 |
| 746,579 | Roedmann | Dec. 8, 1903 |
| 2,298,703 | Key | Oct. 13, 1942 |

OTHER REFERENCES

"Ideal Flue Tools," pp. 22 and 23 of Cat. 48 (June 1915) of Gustav Wiedcke and Co., Dayton, Ohio.